United States Patent [19]

Bakonyi

[11] 4,228,772
[45] Oct. 21, 1980

[54] LOW THROTTLED VOLUME ENGINE

[75] Inventor: Stephen M. Bakonyi, Troy, Mich.

[73] Assignee: General Motors Corporation, Detroit, Mich.

[21] Appl. No.: 8,237

[22] Filed: Feb. 1, 1979

[51] Int. Cl.³ .................. F02D 9/02; F02M 39/00; F01L 3/06

[52] U.S. Cl. .................. 123/403; 123/509; 123/188 M

[58] Field of Search .......... 123/108, 188 M, 139 AW

[56] References Cited

U.S. PATENT DOCUMENTS

| | | | |
|---|---|---|---|
| 1,014,328 | 1/1912 | Podlesak | 123/108 |
| 1,288,982 | 12/1918 | Phinney | 123/52 M |
| 1,347,598 | 7/1920 | Sturm | 123/52 M |
| 3,422,803 | 1/1969 | Stivender | 123/90.16 |
| 3,557,762 | 1/1971 | Mitchell | 123/108 |
| 3,762,376 | 10/1973 | Eberle et al. | 123/242 |
| 3,885,003 | 5/1975 | Kobayashi et al. | 261/23 A |
| 4,064,849 | 12/1977 | Nagasawa | 123/188 M |
| 4,079,718 | 3/1978 | Holzbaur | 123/139 AW |

FOREIGN PATENT DOCUMENTS

| | | | |
|---|---|---|---|
| 2745245 | 4/1978 | Fed. Rep. of Germany | 123/188 M |
| 2816341 | 10/1978 | Fed. Rep. of Germany | 123/108 |
| 950776 | 2/1964 | United Kingdom | 123/139 AW |

Primary Examiner—Charles J. Myhre
Assistant Examiner—Craig R. Feinberg
Attorney, Agent, or Firm—R. L. Phillips

[57] ABSTRACT

A four-stroke cycle spark ignition internal combustion engine having an individual throttle valve for each combustion chamber closely upstream of intake valve port thereto for reducing the pumping loss and cooperating with divided intake passages of different flow areas downstream of the throttle valve to increase and maintain the velocity of the air-fuel mixture into the combustion chamber at small throttle openings.

3 Claims, 5 Drawing Figures

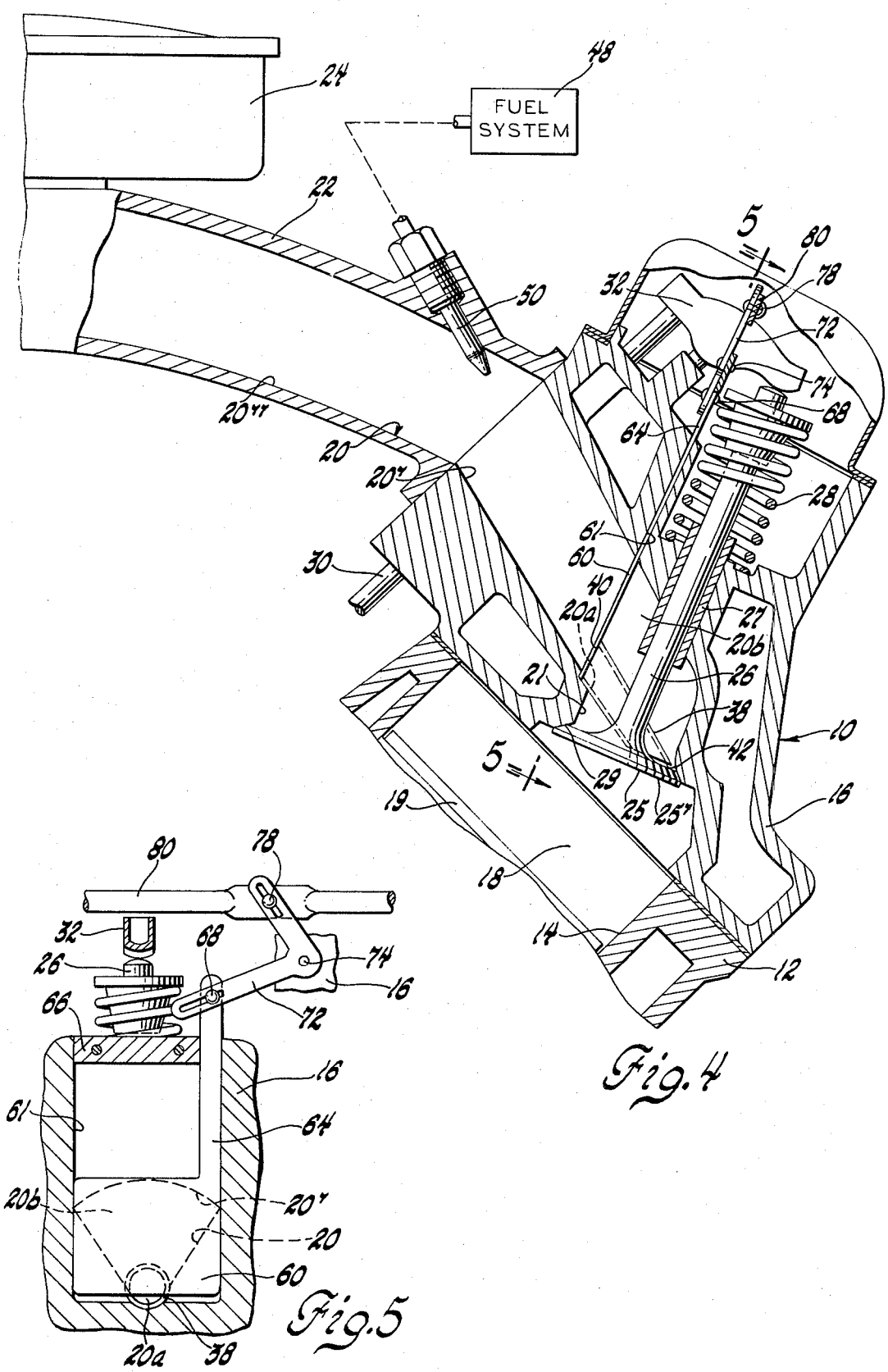

LOW THROTTLED VOLUME ENGINE

LOW THROTTLED VOLUME ENGINE

This invention relates to a low throttled volume engine and more particularly to a throttled induction system which reduces the throttled volume while improving the volumetric efficiency and increasing the combustion burn rate in a four-stroke cycle spark ignition internal combustion engine.

In four-stroke cycle spark ignition internal combustion engines where the air is throttled remote from the intake valve, the large intake passage volume between the throttle and intake valve functions as a vacuum reservoir reducing the combustion chamber pressure to the intake vacuum level as soon as the intake valve is opened. The piston being exposed at its one end to the vacuum and at its opposite end to crankcase pressure which is atmospheric thus has to work against a substantial pressure differential during the entire intake stroke and this produces a substantial loss which is commonly referred to as puming loss. In addition, it is known that a large intake opening to the combustion chamber is best at high load and high speed conditions for good volumetric efficiency but at light load and low speed conditions a large intake opening results in low intake gas velocity and thus a substantial decrease in the volumetric efficiency. And while there are known to be induction system such as U.S. Pat. Nos. 3,557,762 and 1,347,598 which could either achieve a low throttled volume or maintain a relatively high velocity of the fuel mixture at low engine speeds, none of these systems are capable of both reducing the pumping loss while improving the volumetric efficiency and increasing the combustion burn rate as provided by the present invention.

According to the present invention, there is provided a low throttled volume four-stroke cycle spark ignition internal combustion engine by the provision of a single individual throttle valve for each combustion chamber which is mounted in the intake passage thereto immediately upstream of the intake valve port. In addition, the intake passage between the throttle valve and the intake valve port is divided into two parallel passages having relatively small and large flow areas which are successively opened by the throttle valve. Fuel is forced into the intake passage upstream of the throttle valve and as the throttle valve to each combustion chamber is initially opened all or substantially all of the air-fuel mixture in the intake passage thereto is caused to flow during intake valve opening through the small flow area passage and into the combustion chamber at a substantially increased velocity relative to that upstream of the throttle valve. Then as the throttle valve is opened wider, increased flow is allowed into the small flow area passage until eventually the air-fuel mixture is also permitted by the throttle valve to flow into the large flow area passage to the combustion chamber and in an amount which increases with further throttle valve opening. Thus, the air-fuel mixture is directed into the combustion chamber at a substantial velocity throughout the range of throttle valve openings while the pressure upstream of the throttle valve close to the intake port and connected combustion chamber is maintained substantially atmospheric and reduces the pumping loss. The pumping loss is reduced in that with the absence of any throttling upstream of that provided, the pressure in the intake passage almost to the intake valve port is essentially atmospheric. Thus during the time in the cycle that the intake valve is closed, the small volume of the intake passage downstream of the throttle valve to the intake valve port also reaches atmospheric pressure. Then when the intake valve opens during the intake stroke, the pressure in the entire intake system is therefore close to atmospheric pressure. As a result as the piston moves down on the intake stroke, a vacuum only then starts developing in the combustion chamber since the flow area past the throttle valve is insufficient to keep the combustion chamber pressure at the atmospheric level as the chamber expands. The vacuum gradually builds up to a maximum level which is reached when the piston is at bottom dead center and the intake valve closes with the amount of vacuum, and consequently the engine power output, dependent upon the amount of throttle opening similar to that of the conventional engine.

Furthermore, with the throttle valve located close to the intake valve port and throttling only the small flow area passage during partial throttle valve openings including idle, the high velocity air-fuel flow past the throttle valve is not dissipated and instead is maintained and directed by the small flow area passage to flow into the combustion chamber setting up a strong swirling action which results in an increased burn rate for combustion such that the cycle becomes a closer approximation to the constant volume cycle.

An object of the present invention is to provide a new and improved low throttled volume spark ignition internal combustion engine.

Another object is to provide in an internal combustion engine, an induction system providing improved volumetric efficiency and increased combustion burn rate as well as reduced pumping loss.

Another object is to provide in a four-stroke cycle internal combustion engine, an induction system having a throttle valve closely upstream of each intake valve port cooperating with a small flow area passage and large flow area passage which are both of short length to reduce pumping loss, increase volumetric efficiency and increase combustion burn rate.

These and other objects of the invention will be more apparent from the following description and drawings in which:

FIG. 4 is a view similar to FIG. 2 showing another embodiment of the induction system according to the present invention.

FIG. 5 is a view taken along the line 5—5 in FIG. 4.

Figure 1:
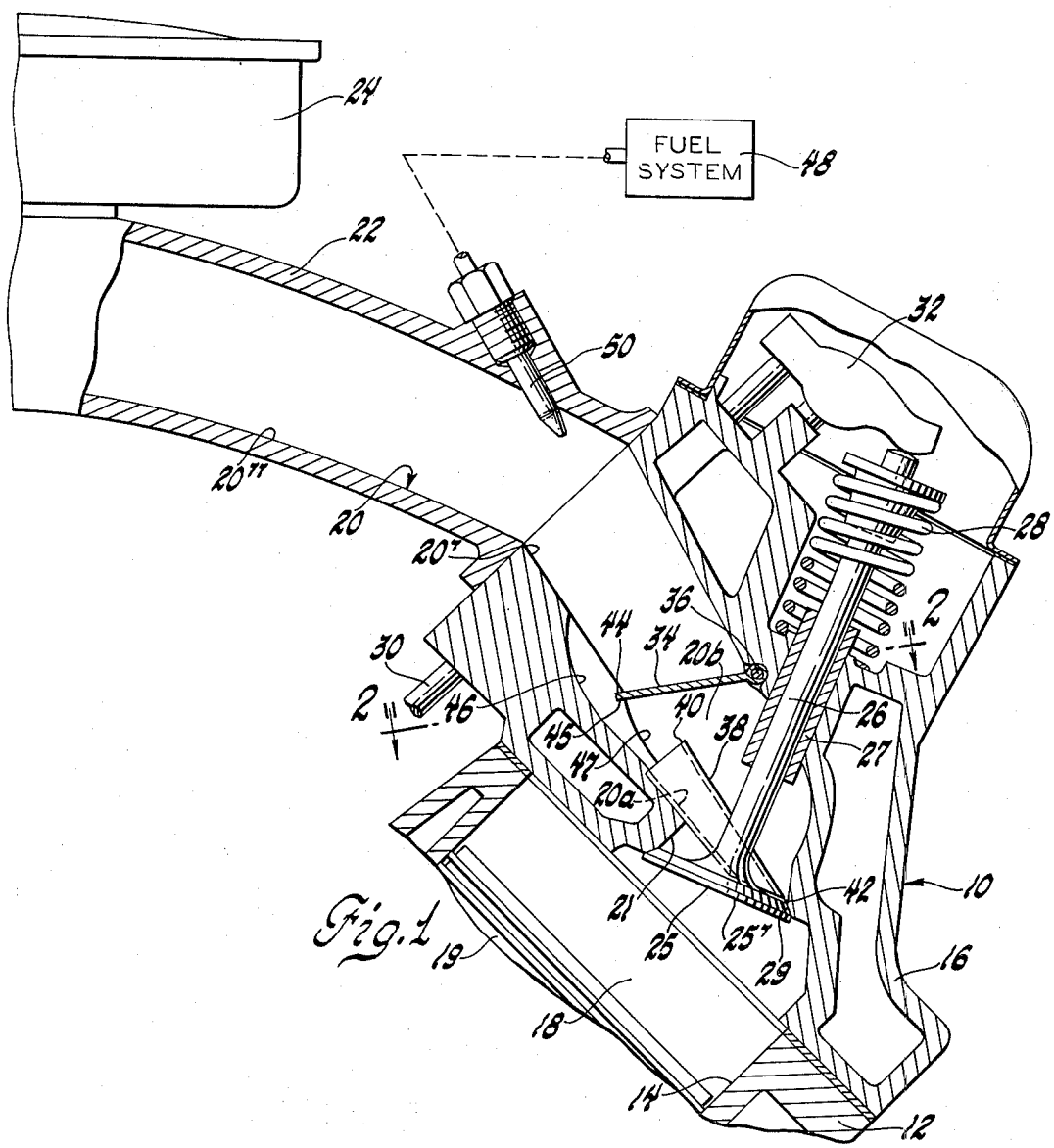
FIG. 1 is a partial view cross-wise of a four-stroke cycle spark ignition internal combustion engine of the reciprocating type having an induction system according to the present invention with some parts shown in section and some parts shown in outline.

Referring to FIG. 1, there is shown a four-stroke cycle spark ignition internal combustion engine 10 of the reciprocating piston type with a V-arrangement having an induction system according to the present invention and wherein only those engine parts are shown which are believed helpful to understanding the invention. The engine includes a cylinder block 12 having two banks of one or more cylinders 14 each of which is closed at its upper end by a cylinder head 16 to form a combustion chamber 18 above a reciprocating piston 19 that is disposed in the cylinder. In a conventional manner, but not shown, the piston 19 is connected by a connecting rod to drive a crankshaft which is rotatably mounted in the cylinder block.

Delivery of air and fuel to the combustion chambers is provided by an induction system having an intake passage 20 for each chamber which is open thereto through an intake port 21 in the cylinder head. The intake passage has a portion 20' which extends through the cylinder head and communicates with another portion 20" in an intake manifold 22 that is fixed to the head and supports an air cleaner 24 across an air inlet to the intake passage. Admission of air-fuel mixture to each combustion chamber 18 is controlled by an intake valve 25 of the poppet type having a stem 26 which extends through the intake port 21 and across the cylinder head's intake passage 20' and is reciprocally mounted in a valve guide 27 mounted in the cylinder head. The intake valve 25 is biased by a spring 28 to close against a valve seat 29 formed in the intake port 21 and controlled opening and closing thereof is provided in a conventional manner by a camshaft, not shown, which is driven by the crankshaft and operates through a push rod 30 and a rocker arm 32 on the end of the valve stem 26. The engine also has an exhaust valve arrangement, not shown, for each combustion chamber which is operated in similar manner from the camshaft to exhaust the products of combustion. The engine construction thus far described is conventional and with air-fuel delivery to the engine and ignition by a spark plug, not shown, there will be effected the four phases of the Otto cycle with the power dependent upon the rate of air-fuel deilvery thereto, Furthermore, it will be understood that the invention is also applicable to other cylinder arrangements as will become more clear from the following description.

Figure 2:
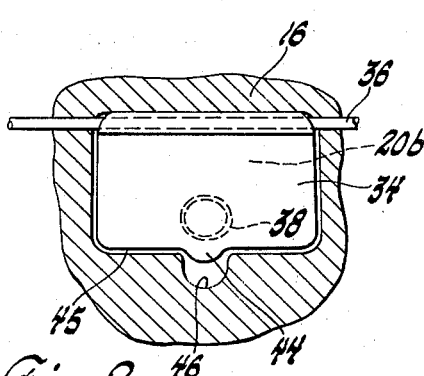
FIG. 2 is a view taken along the line 2—2 in FIG. 1.

According to the present invention, pumping loss is reduced and the volumetric efficiency is improved at light load and low speed operating conditions and the combustion burn rate is increased by providing an individual throttle valve for each combustion chamber in its intake passage 20 closely upstream of the respective intake valve stem 26 and dividing the remaining short length of intake passage downstream thereof into separate small and large flow area passages. In the embodiment shown in FIG. 1, this is accomplished with a throttle valve 34 which has the same general flow area shape as the cylinder head's intake passage 20' which is rectangular with rounded corners as shown in FIG. 2. The throttle valve 34 is fixed along its upper edge to a shaft 36 which is pivotally mounted in the cylinder head 16 adjacent the valve guide 27 and extends from one end out of the cylinder head to be controlled through suitable linkage, not shown, by the vehicle operator. With such linkage, the operator depresses an accelerator pedal to pivot the throttle valve 34 clockwise as viewed in FIG. 1 to effect throttle opening and upon release of the accelerator a return spring biases the throttle valve counterclockwise to close.

The cylinder head's intake passage 20' downstream of the throttle valve 34 is divided into separate passages 20a and 20b extending to the intake port 21 by a tube 38 which is fixed to the side of the intake passage opposite the side at which the throttle valve 34 is pivoted. The inlet end 40 of the tube 38 is located opposite the pivoted edge of the throttle valve 34 and the intake passage 20a which is through the tube 38 has a small flow area as compared to that of the intake passage 20b past the tube. The outlet end 42 of the tube terminates adjacent the upstream side of the intake valve head 25' in its closed position and at the valve head's perimeter so as to be in a position to direct its flow through the intake valve opening and into the combustion chamber to promote swirl within the combustion chamber during the intake stroke to promote fast burning.

The throttle valve 34 and the same flow area passage 20a cooperate to provide a high velocity stream into the combustion chamber during initial throttle valve opening. This is provided by the throttle valve 34 having a tongue portion 44 which extends centrally from the free swinging edge 45 thereof and which is swingable with a small clearance in a longitudinal slot 46 in the intake passage wall 20' as the edge 45 swings with a small clearance past a recessed arcuate portion 47 also formed in this intake passage wall. The slot 46 merges at its downstream end with the inlet 40 of the tube passage 20a and extends upstream past the swing of the projecting throttle valve portion 44 to intersect on a curve with the intake passage wall.

With the location of the throttle valve 34 closed to the intake valve port 21, the normal vaccum signal in the intake manifold 22 is thus eliminated and so to provide fuel to the induction system, there is used a positive pressure fuel system 48 of the injection type which forces delivery of fuel through a fuel injector 50. The injector 50 is mounted in the intake manifold 22 close to the cylinder head and is oriented so as to direct the fuel into the manifold intake passage 20" downstream toward the throttle valve 34.

With the throttle valve 34 pivoted at one side of the intake passage 20, the flow of the air-fuel mixture is thus concentrated along the opposite side of the intake passage past the opposite free edge of the throttle valve where the inlet 40 to the small flow area passage 20a is located. At idle, the throttle valve is adjusted to a position wherein its depending portion 44 is located in the slot 46 slightly away from the tube inlet 40. Thus all or most all of the mixture is forced to converge at the throttle valve and flow through the slot into the small flow area passage 20a which then maintains the thus increased velocity of the mixture until its entry into the combustion chamber thereby enhancing idle running. This cooperation between the throttle valve extension 44 and the slot 46 continues as the throttle valve is opened and swings through the slot with substantially all of the mixture having its velocity accelerated and maintained at a level substantially higher than that upstream of the throttle valve for introduction into the combustion chamber to maintain a strong swirling action at the low throttle valve openings. As the throttle valve 34 is further opened and leaves the slot 46, substantial flow is then allowed into the large flow area passage 20b with the proportion of flow that is receives increasing as the throttle valve continues to be opened wider. As a result, the air-fuel mixture is delivered to the combustion chamber at a substantial velocity throughout the range of throttle valve openings while the pressure at the intake or inlet port to the combustion chamber remains substantially atmospheric to minimize engine pumping loss.

Figure 3:
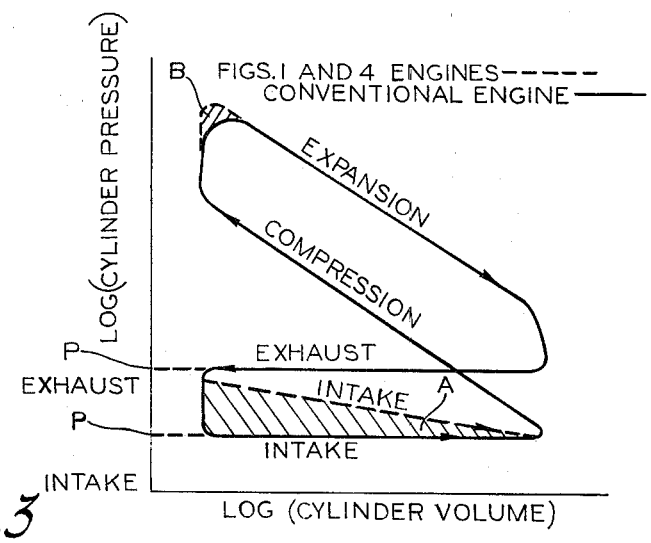
FIG. 3 is a graph illustrating the operating characteristics of the engines in FIGS. 1 and 4 compared with a conventional engine.

The advantages of the above low throttled volume engine structure are shown in dash line in comparison with a conventional engine in FIG. 3 with combustion chamber pressure plotted against chamber volume on a log-log scale. During the intake stroke, the combustion chamber pressure departs markedly from the conventional and follows the dash line with the vacuum in the combustion chamber building gradually. The pressure builds gradually in that when the intake valve opens during the intake stroke, only then does the vacuum start developing in the combustion chamber since the flow area past throttle valve 34 is insufficient to keep the chamber pressure at the atmospheric level. This vacuum gradually builds up to the maximum level which is reached when the piston is at bottom dead center and the intake valve closes with the amount of vacuum and consequently the engine power output dependent upon the amount of throttle opening similar to a conventional engine. The piston thus does minimal work due to the reduced pressure differential with the area of the pumping loop substantially reduced as shown by the shaded area A. In contrast, in the conventional engine used for comparison which has the throttle valve located remotely upstream of the intake valve, the large intake passage volume in the intake manifold and cylinder head functions as a vacuum reservoir reducing the cylinder pressure to the intake vacuum level as soon as the intake valve is opened. In that case the piston must work against the large pressure differential during the entire intake stroke which would increase the area of the pumping loop by the shaded amount shown. The reduced pumping loop achieved by the low throttled volume engine results in increased engine efficiency and reduced fuel-consumption. The other aspect of the pivotal arrangement and close location of the throttle valve 34 is to concentrate the flow and minimize dissipation of the increased velocity before reaching the combustion chamber. And this is enhanced by the cooperation between the throttle valve 34 and the slot 46 and the separate small and large flow area passages 20a and 20b to produce an increased velocity of the mixture that is sustained into the combustion chamber to increase the volumetric efficiency and set up a strong swirling action. This swirling action increases the burn rate during combustion as compared with the conventional engine with the result that the combustion more closely approaches a constant volume process increasing the work done as shown by the added shaded area B in FIG. 3. Thus, the thermal efficiency as well as the volumetric efficiency is increased and the fuel consumption is reduced with the increased burn rate also providing increased EGR tolerance, leaner air/fuel ratio tolerance, reduced cycle-to-cycle fluctuation, and reduced octane requirement.

Another embodiment of the throttled engine which prevents any dispersion of the flow past the throttle valve at small throttle openings is shown in FIGS. 4 and 5 wherein parts similar to those in FIGS. 1 and 2 are identified by like numbers and different parts are identified by new numbers. In the FIGS. 4 and 5 embodiment all of the initial flow is forced to enter the small flow 20a area passage provided by the tube 38 to minimize the dispension of flow past the throttle and this is provided by sliding throttle valve 60 in the form of a plate which is generally rectangular in shape and is slidably mounted in a slot 61 formed in the cylinder head 16.

The throttle valve 60 is arranged for movement across the intake passage 20' in the cylinder head immediately upstream of the intake valve stem 26 at the inlet end 40 of the tube 38. The intake passage 20' in this case has an upper half with a semi-circular cross-section and a lower half with a V-shaped cross-section whose apex is at the inlet to the small flow area passage 20a. The throttle valve 60 is operated by an arm 64 which extends from an upper corner thereof and out through the upper end of the slot past a sealing block 66 fixed in the slot. The upper end of the arm 64 has a pin and slot connection 68 with one arm of a lever 72 which is pivotally mounted on the cylinder head 16 by a pin 74 for pivotal movement about an axis at right angles to the arm 64. The lever 72 has another arm with a pin and slot connection 78 to a rod 80. The rod 80 is reciprocally mounted in the cylinder head and extends from one end thereof so that it may be pulled rightwardly to open the throttle plate by the operator by conventional linkage, not shown. Alternatively, the rod 80 is biased leftwardly on release of the accelerator pedal to close the valve by the throttle linkage's normal return spring. As a result, only the small flow area passage 20a is initially opened to thereby receive all the air-fuel mixture as the throttle valve 60 is slid upward from its closed position and thereafter the large flow area passage 20b is also opened to receive the mixture. Otherwise the embodiment in FIG. 4 operates the same as that in FIG. 1 to reduce the throttled volume of the engine, improve the volumetric efficiency and increase the burn rate as illustrated in FIG. 3.

The above described embodiments are illustrative of the invention which may be modified within the scope of the appended claims.

The embodiments of the invention in which an exclusive property or privilege is claimed are defined as follows:

1. In an internal combustion engine, a combustion chamber having an intake port, an intake valve operable to open and close said intake port, and a single-throttle air-fuel delivery system for delivering a throttled air-fuel mixture to said intake port comprising an intake passage having an inlet end open to an air supply and an outlet end connected to said intake port, dividing means separating said intake passage into separate small and large flow area passages forming a throttled portion extending from said intake port having a short length as compared to the remaining unthrottled length of said intake passage, fuel supply means for supplying fuel to said intake passage a location upstream of its division, and a single throttle valve in said intake passage adjacent said intake port and upstream of said dividng means for throttling both said small and large flow area passages so that at small throttle valve openings at least substantially all the air-fuel mixture is caused to flow through said small flow area passage to said intake port at a substantially increased velocity relative to that upstream of said throttle valve and without substantial dissipation and at large throttle valve openings the air-fuel mixture is caused to flow through both of said small and large flow area passages to said intake port whereby air-fuel mixture is delivered to said intake port throughout the range of throttle valve openings by the cooperation between said throttle valve and said small and large flow area passages while the pressure upstream of said throttle valve and adjacent said intake port is maintained substantially atmospheric by virtue of said short throttled portion to minimize engine pumping loss.

2. In an internal combustion engine, a combustion chamber having an intake port, an intake valve operable to open and close said intake port, and a single-throttle air-fuel delivery system for delivering a throttled air-fuel mixture to said intake port comprising an intake passage having an inlet end open to an air supply and an outlet end connected to said intake port, a tube dividing said intake passage into separate small and large flow area passages forming a throttled portion extending from said intake port having a short length as compared to the remaining unthrottled length of said intake passage, said small flow area passage being through said tube and having an outlet directed toward where said intake valve opens, fuel supply means for supplying fuel to said intake passage at a location upstream of its division, and a single throttle valve pivotally mounted in said intake passage adjacent said intake port and upstream of said tube for cooperating with said intake passage and said tube to throttle both said small and large flow area passages so that at small throttle valve openings substantially all the air-fuel mixture is caused to flow through said small flow area passage to said intake port at a substantially increased velocity relative to that upstream of said throttle valve and without substantial dissipation and at large throttle valve openings the air-fuel mixture is caused to flow through both of said large flow area passages to said intake port whereby air-fuel mixture is delivered to said intake port throughout the range of throttle valve openings by the cooperation between said throttle valve and said small and large flow area passages while the pressure upstream of said throttle valve and adjacent said intake port is maintained substantially atmospheric by virtue of said short throttled portion to minimize engine pumping loss.

3. In an internal combustion engine, a combustion chamber having an intake port, an intake valve operable to open and close said intake port, and a single-throttle air-fuel delivery system for delivering a throttled air-fuel mixture to said intake port comprising an intake passage having an inlet end open to an air supply and an outlet end connected to said intake port, a tube dividing said intake passage into separate small and large flow area passages forming a throttled portion extending from said intake port having a short length as compared to the remaining unthrottled length of said intake passage, said small flow area passage being through said tube and having an outlet directed toward where fuel supply means for supplying fuel to said intake passage at a location upstream of its division, and a single throttle valve slidably mounted in said intake passage adjacent said intake port and upstream of said tube for cooperating with said intake passage and said tube to throttle both said small and large flow area passages so that at small throttle valve openings all the air-fuel mixture is caused to flow through said small flow area passage to said intake port at a substantially increased velocity relative to that upstream of said throttle valve and without substantial dissipation and at large throttle valve openings the air-fuel mixture is caused to flow through both of said small end large flow area passages to said intake port whereby air-fuel mixture is delivered to said intake port throughout the range of throttle valve openings by the cooperation between said throttle valve and said small and large flow area passages while the pressure upstream of said throttle valve and adjacent said intake port is maintained substantially atmosphereic by virtue of said short throttled portion to minimize engine pumping loss.

* * * * *

UNITED STATES PATENT AND TRADEMARK OFFICE
CERTIFICATE OF CORRECTION

PATENT NO. : 4,228,772
DATED : October 21, 1980
INVENTOR(S) : Stephen M. Bakonyi It is certified that error appears in the above-identified patent and that said Letters Patent are hereby corrected as shown below:

Column 1, line 22, "puming" should be -- pumping --.

Column 3, line 34, "deilvery" should read -- delivery --.

Column 4, line 9, "same" should be -- small --.

Column 4, line 23, "closed" should be -- close --.

Column 4, line 56, "is" should be -- it --.

Column 6, line 45, claim 1, "dividng" should be -- dividing --.

Column 7, line 20, claim 2, after "said", insert -- small and --.

Column 8, line 23, claim 3, "end" should read -- and --.

Signed and Sealed this

Nineteenth Day of May 1981

[SEAL]

Attest:

RENE D. TEGTMEYER

*Attesting Officer*   *Acting Commissioner of Patents and Trademarks*